(12) United States Patent
Kinomura et al.

(10) Patent No.: US 8,161,261 B2
(45) Date of Patent: Apr. 17, 2012

(54) METHOD AND APPARATUS FOR OPERATING DATA, SUCH AS TOTALING DATA, ETC

(75) Inventors: Mitsuhiro Kinomura, Kawasaki (JP); Kiichi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/606,735

(22) Filed: Oct. 27, 2009

(65) Prior Publication Data
US 2010/0125711 A1 May 20, 2010

(30) Foreign Application Priority Data
Oct. 28, 2008 (JP) .................................. 2008-277181

(51) Int. Cl.
*G06F 12/00* (2006.01)

(52) U.S. Cl. ........ 711/170; 711/153; 711/173; 711/200; 711/201

(58) Field of Classification Search ........................ None
See application file for complete search history.

(56) References Cited

U.S. PATENT DOCUMENTS
6,161,155 A * 12/2000 Simms et al. ................... 710/57
2003/0093646 A1* 5/2003 Stark ............................. 711/219

FOREIGN PATENT DOCUMENTS
JP 2006-171800 A 6/2006

* cited by examiner

*Primary Examiner* — Kevin Ellis
*Assistant Examiner* — Alan Otto
(74) *Attorney, Agent, or Firm* — Fujitsu Patent Center

(57) ABSTRACT

A totaling device includes a first specification unit comprising a first storage unit for storing first dividing information and first interpolation value information, a second storage unit for storing second dividing information and second interpolation value dividing information and a third storage unit for storing information of a totaling information storage unit for storing totaling information; a second specification unit for specifying the third storage unit related to the second dividing information which coincides with second total dividing information or the third storage unit related to the second interpolation value dividing information which coincides with the second total dividing information; and a totaling unit for specifying a totaling information storage unit and storing the totaling information of the totaling target information in the totaling information storage unit.

10 Claims, 19 Drawing Sheets

| NAME | SCORE |
|---|---|
| AAAAA | 33 |
| BBBBB | 40 |
| CCCCC | 05 |
| DDDDD | 33 |
| EEEEE | 45 |
| FFFFF | 45 |
| GGGGG | 30 |
| HHHHH | 15 |
| IIIII | 40 |
| JJJJJ | 40 |

~1200

F I G. 1

| EVALUATION | SCORE RANGE |
|---|---|
| VERY GOOD | 45~50 |
| GOOD | 40~44 |
| FAIRLY GOOD | 30~39 |
| BAD | 0~29 |

1300

F I G. 2

1501

| SCORE | NUMBER OF PERSONS | TOTAL (SCORE × NUMBER OF PERSONS) | EVALUATION |
|---|---|---|---|
| 45 | 2 | 90 | VERY GOOD |

1502

| SCORE | NUMBER OF PERSONS | TOTAL (SCORE × NUMBER OF PERSONS) | EVALUATION |
|---|---|---|---|
| 40 | 3 | 120 | GOOD |

1503

| SCORE | NUMBER OF PERSONS | TOTAL (SCORE × NUMBER OF PERSONS) | EVALUATION |
|---|---|---|---|
| 33 | 2 | 66 | FAIRLY GOOD |
| 30 | 1 | 30 | FAIRLY GOOD |

SECONDARY TOTALING NEEDED

1504

| SCORE | NUMBER OF PERSONS | TOTAL (SCORE × NUMBER OF PERSONS) | EVALUATION |
|---|---|---|---|
| 15 | 1 | 15 | BAD |
| 5 | 1 | 5 | BAD |

SECONDARY TOTALING NEEDED

F I G. 4

| EVALUATION | NUMBER OF PERSONS | AVERAGE |
|---|---|---|
| VERY GOOD | 2 | 45 |
| GOOD | 3 | 40 |
| FAIRLY GOOD | 3 | 32 |
| BAD | 2 | 10 |

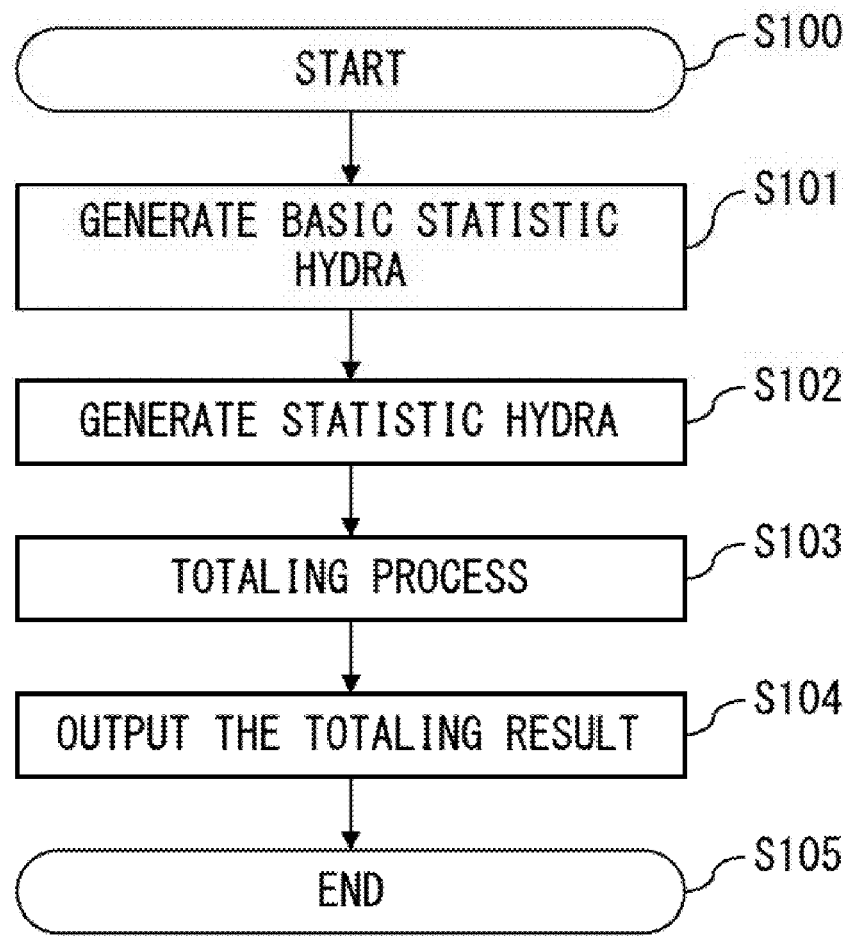
F I G. 6

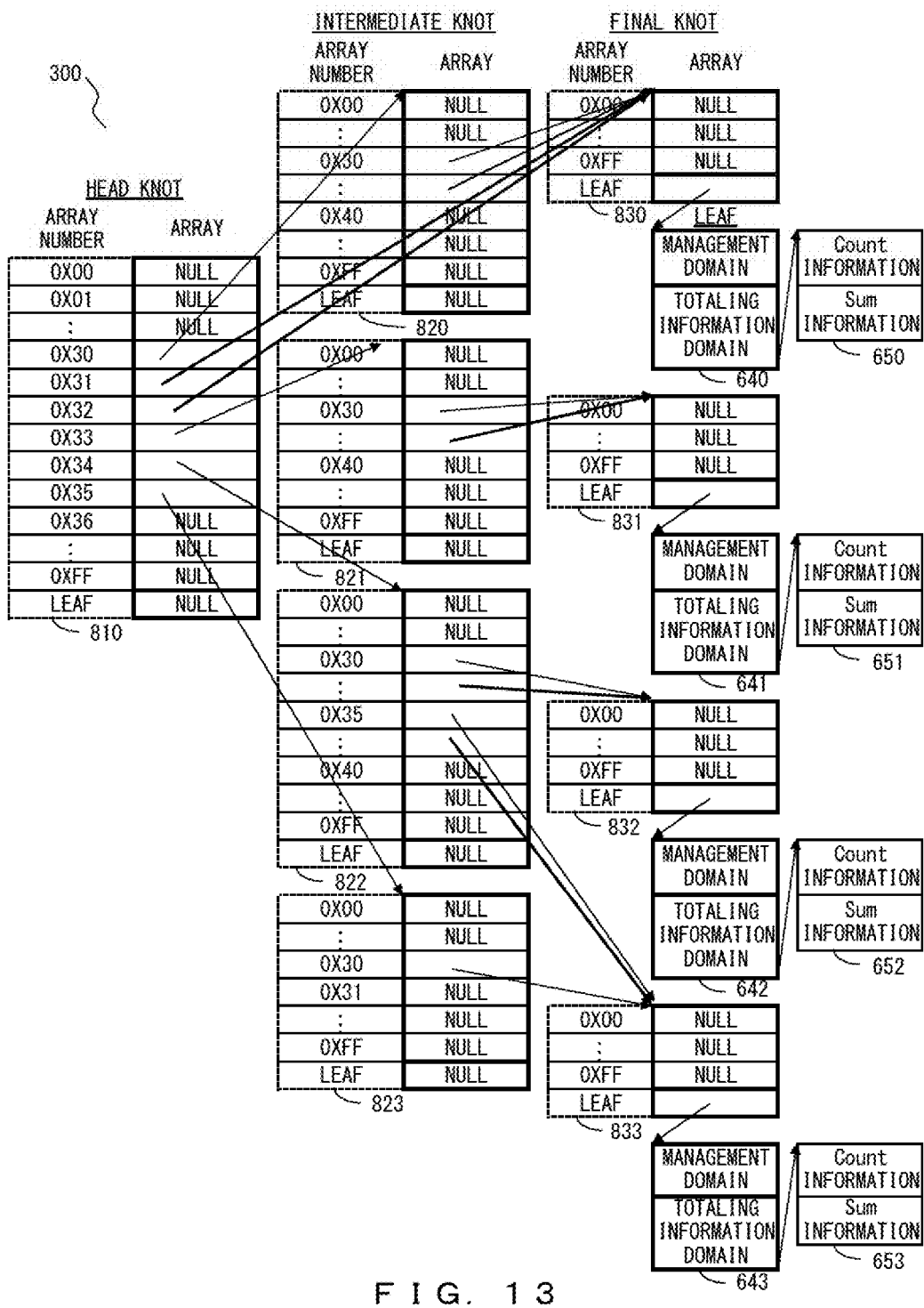
F I G. 1 3

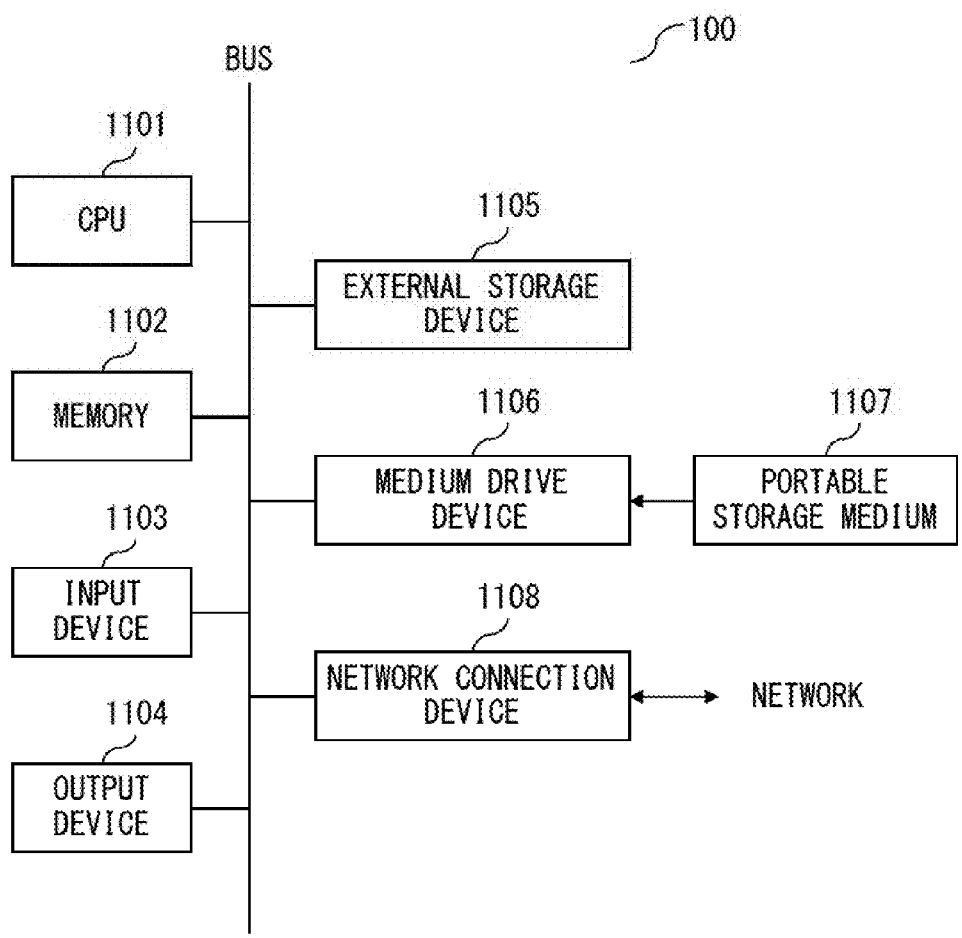
F I G. 1 6

METHOD AND APPARATUS FOR OPERATING DATA, SUCH AS TOTALING DATA, ETC

CROSS-REFERENCE TO RELATED APPLICATION

This application is based upon and claims the benefit of priority of the prior Japanese Patent Application No. 2008-277181, filed on Oct. 28, 2008, the entire contents of which are incorporated herein by reference.

FIELD

The embodiments discussed herein are related to a method for operating data, such as totaling data and so on.

BACKGROUND

In a system, such as a basic business system for doing basic business and the like, since the scale of generated/stored data is large, the efficient execution of a process, such as data totaling, profiling, cleansing, add-up and the like, is required.

In relation to the above-described technology, a technology for automatically obtaining necessary data from a file (data) stored by a plurality of applications, using the statistic hydra of a TRIE structure is known.

The "statistic hydra" described here is the prior art different from "statistic hydra" described later as the best Mode for carrying out the invention.

For example, when a test result data 1200 illustrated in FIG. 1 is classified into "very good", "good", "fairly good" and "bad" according to an evaluation table 1300 illustrated in FIG. 2 and in order to obtain their distribution and its average, the following processes are needed.

(1) A statistic hydra 1400 illustrated in FIG. 3 is generated from the test result data 1200 and a primary totaling is applied to each score. As a result, a totaling result 1401 for each "score" is obtained.

(2) The data of the totaling result 1401 is classified into respective "score ranges" of the evaluation table 1300, for example, using the following retrieval expressions. As a result, as illustrated in FIG. 4, the totaling results 1501, 1502, 1503 and 1504 for each "score range" of the evaluation table 1300 are obtained.

Total data group retrieval expression of "very good":
Score$\geq$45 AND score$\leq$50

Total data group retrieval expression of "good":
Score$\geq$40 AND score<45

Total data group retrieval expression of "fairly good":
Score$\geq$30 AND score$\leq$40

Total data group retrieval expression of "bad": Score$\geq$0 AND score<30

(3) Since a plurality of totaling results is obtained in the totaling results 1503 and 1504, the secondary totaling is executed in order to obtain a totaling result for each "score range". As a result, a desired totaling result 1600 illustrated in FIG. 5 is obtained.

Patent document 1: Japanese Laid-open Patent Publication No. 2006-171800

SUMMARY

However, in the above-described totaling process since it is necessary to perform a secondary totaling in addition to a primary totaling in order to obtain a desired totaling result, it takes much processing time.

In order to attain the above object, this totaling method includes a first specification process for referring to the first storage unit in a totaling storage unit which comprises a first storage unit for storing first dividing information which is border value information for specifying a desired range and is obtained by dividing border value information belonging to the desired range in a first dividing position and first interpolation value dividing information obtained by dividing interpolation value information obtained by interpolating a value in the desired range of other than the border value information in the first dividing position, a second storage unit for storing second dividing information obtained by dividing the border value information in a second dividing position adjacent to the first dividing position in a certain direction and second interpolation value dividing information obtained by dividing the interpolation value information in the second dividing position and a third storage unit for storing information of a totaling information storage unit for storing totaling information of a range to which the border value information belongs and in which the first storage unit has relation information between the first dividing information and the second storage unit and relation information between the first interpolation value dividing information and the third storage unit and the second storage unit has relation information between the second dividing information and the third storage unit and relation information between the second interpolation value dividing information and the third storage unit and specifying the second storage unit related to the first dividing information which coincides with first total dividing information obtained by dividing totaling target information being totaling target in the first dividing position or the third storage unit related to the first interpolation value dividing information which coincides with the first total dividing information, a second specification process for referring to the second storage unit and specifying the third storage unit related to the second dividing information which coincides with second total dividing information obtained by dividing the totaling target information in the second dividing position or the third storage unit related to the second interpolation value dividing information which coincides with the second total dividing information and a totaling process for specifying a totaling information storage unit according to information stored by third storage unit specified by the first or second specification process and storing totaling information of the totaling target information in the totaling information storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is an example of test result data.
FIG. 2 is an example of an evaluation table.
FIG. 4 explains a secondary totaling.
FIG. 5 is an example of a totaling result.
FIG. 6 is a flowchart illustrating the summary of the process of a totaling apparatus in this preferred embodiment.

FIG. 13 explains the detailed statistic hydra.

FIG. 16 is a configuration example of a totaling apparatus 100.

DESCRIPTION OF EMBODIMENTS

Preferred embodiments of the present invention will be explained with reference to FIGS. 6 through 16. In the following explanation, the test result data 1200 illustrated in FIG. 1 is classified into "very good", "good", "fairly good" and "bad" according to an evaluation table 1300 illustrated in FIG. 2 and their distribution and its average are obtained.

FIG. 6 is a flowchart illustrating the summary of the process of a totaling apparatus 100.

In step S101 the totaling apparatus 100 obtains the border value information 201 of a score range from the evaluation table 1300 and generates the basic statistic hydra 200 of the border value information 201 on memory 1102 provided for the totaling apparatus 100.

Although in this preferred embodiment the basic statistic hydra 200 and statistic hydra 300, which will be described later, are generated on the memory 1102, the basic statistic hydra 200 and the statistic hydra 300 can be also generated on virtual memory.

Hereinafter, the statistic hydra 200 generated in step S101 is called "basic statistic hydra 200" in order to discriminate it from the statistic hydra 300, which will be described later.

In step S102 the totaling apparatus 100 interpolates parts other than the border value information 201 of the basic statistic hydra 200 generated in step S101. Hereinafter, the interpolated basic statistic hydra 200 is called "statistic hydra 300".

In step S103 the totaling apparatus 100 perform the totaling process of the test result data 1200 according to the statistic hydra 300 generated in step S102. The totaling result is stored in a totaling information storage domain, which will be described later.

In step S104 the totaling apparatus 100 outputs the result of the totaling performed in step S103 to the memory 1102, an external storage device 1105, a portable storage medium 1107, a network and the like.

If necessary, desired information, such as an average score and the like, obtained from the totaling result is calculated and outputted to the memory 1102 and the like.

Figure 3:
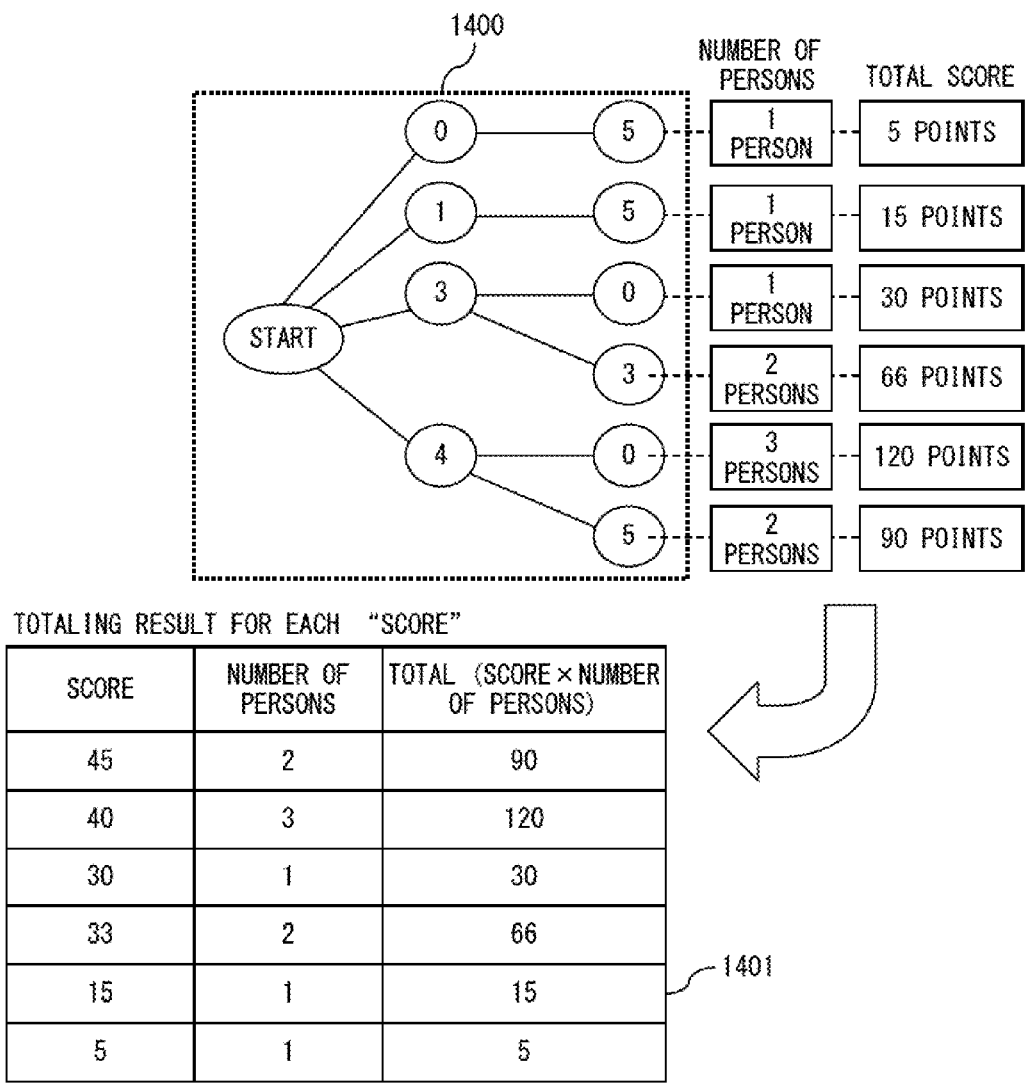
FIG. 3 explains conventional statistic hydra.
Figure 7:
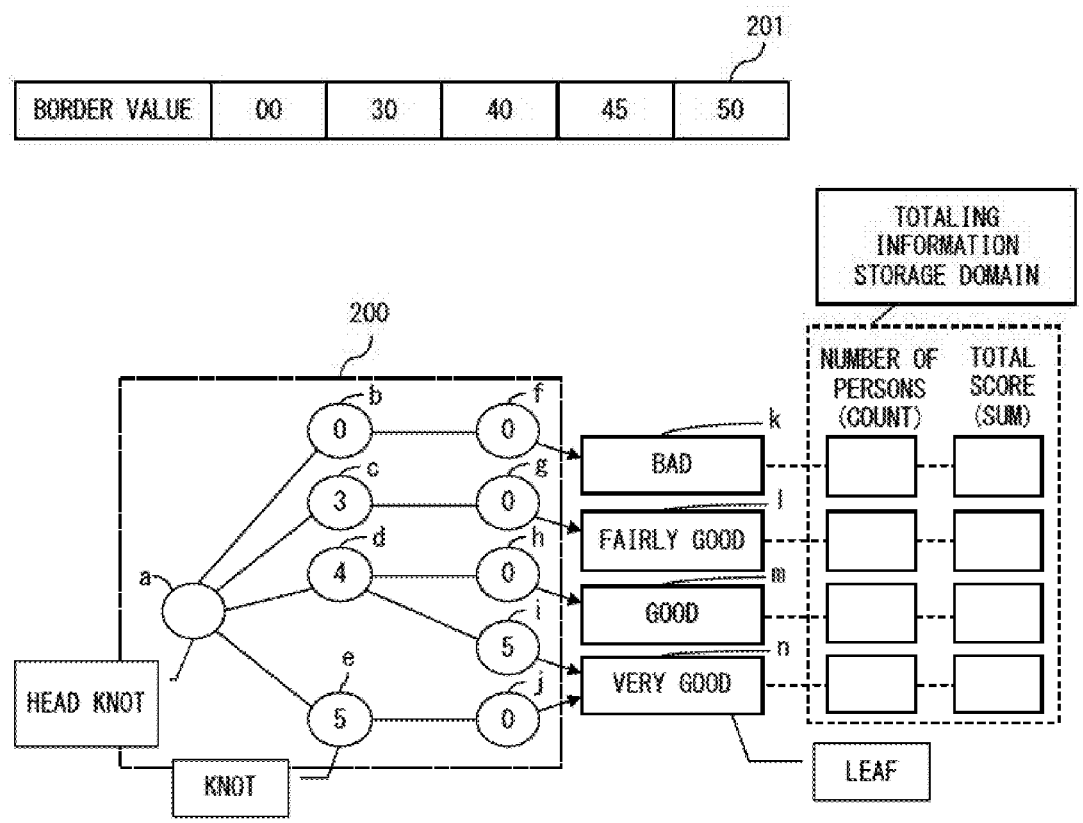
FIG. 7 explains the summary of basic statistic hydra generated by a process in step S101.

FIG. 7 explains the summary of the basic statistic hydra 200 generated by the process in step S101.

The basic statistic hydra 200 illustrated in FIG. 7 is composed of the knots a-j of a border value. Then, the basic statistic hydra 200 has a hierarchical structure.

The "knot of a border value" includes the information of part of a border value and information for relating it to a knot having the information of another part of the same border value or the leaf of the same border value. The "leaf" is the totaling information of a value composed of a series of related knots. The leaf in this preferred embodiment is, for example, composed of the address information of the totaling information storage domain storing the number of persons, a total score and the like.

Hereinafter, a knot a becoming the start point of the basic statistic hydra 200 is called "head knot". A knot related to another knot and a knot related to a leaf are called "intermediate knot" and "final knot", respectively. Therefore, a knot a is a head knot. Knots b, c, d and e are intermediate knots. Knots f, g, h, i and j are final knots. Reference symbols k, l, m and n are leaves.

The intermediate knots illustrated in FIG. 7 includes a value in the ten place of the border value of the border value information 201 and the address information of a storage domain which stores knots having the value in the one place of the same border value. The final knot illustrated in FIG. 7 includes a value in the one place of the border value of the border value information 201 and the address information of a storage domain which stores a leaf having the address information of the totaling information storage domain which stores the totaling information of a border value composed of a series of related knots.

For example, as to a border value "30", the intermediate knot c includes a value "3" in the ten place of the border value "30" and the address information of a storage domain which stores the final knot g having a value "0" in the one place of the border value "30".

Similarly, as to a border value "30", the final knot g includes a value "0" in the one place of the border value "30" and the address information of a storage domain which stores a leaf having the address information of the totaling information storage domain which stores the totaling information (the number of persons and a total score) of the border value "30" composed of a value having a series of related knots (the intermediate knot c and the final knot g).

Although FIG. 7 illustrates a two-layer structure of a layer composed of intermediate knots and a layer composed of final knots, which is not restrictive of the invention. The number of layers is naturally determined according to the divided number of a border value.

Figure 8:
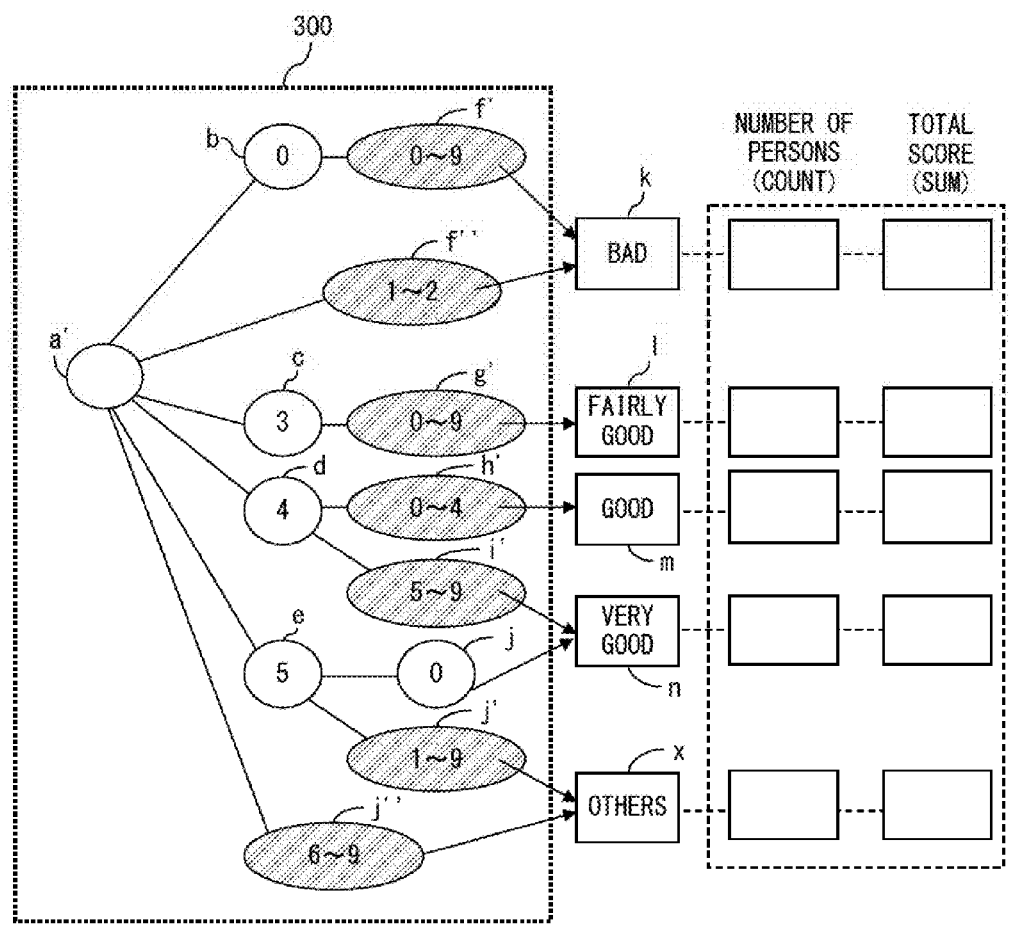
FIG. 8 explains the summary of statistic hydra generated by a process in step S102.

FIG. 8 explains the summary of the statistic hydra 300 generated by the process in step S102.

The statistic hydra 300 illustrated in FIG. 8 is composed of the knot of a border value and the knot of a value obtained by interpolating values between border values. Hereinafter, the value obtained by interpolating values between border values is called "interpolation value". Like the basic statistic hydra 200, the statistic hydra 300 also has a hierarchical structure.

"The knot of an interpolation value" includes the part or full information of a value obtained by interpolating a value other than a border value and information for relating it to the leaf of the same interpolation value.

Hereinafter, the knot of an interpolation value is called "interpolation knot". Knots a', f', f", g', h', i', j' and j" illustrated in FIG. 8 are interpolation knots.

For example, the interpolation knots f' and f" are the interpolation knots of a value obtained by interpolating values between border values "00" and "30".

Since the interpolation knot f' is a final knot following the intermediate knot b, it includes values "0" through "9" in the one place between "00" and "10" and the address information of a storage domain which stores the leaf k having the address information of the totaling information storage domain which stores the totaling information (the number of persons and a total score) of values "00" through "09" composed of each value of a series of related knots (the intermediate knot b and the interpolation knot f').

Since the interpolation knot f" is an intermediate knot following a head knot, it includes values "1" and "2" in the ten place of between "10" and "30". Simultaneously, since the interpolation knot f" is also a final knot, it includes the address information of a storage domain storing the leaf k having the address information of the totaling information storage domain which stores the totaling information (the number of persons and a total score) of values between "10" and "30".

The totaling information between "00" and "30" is stored in the totaling information indicated by the leaf k.

Figure 9:
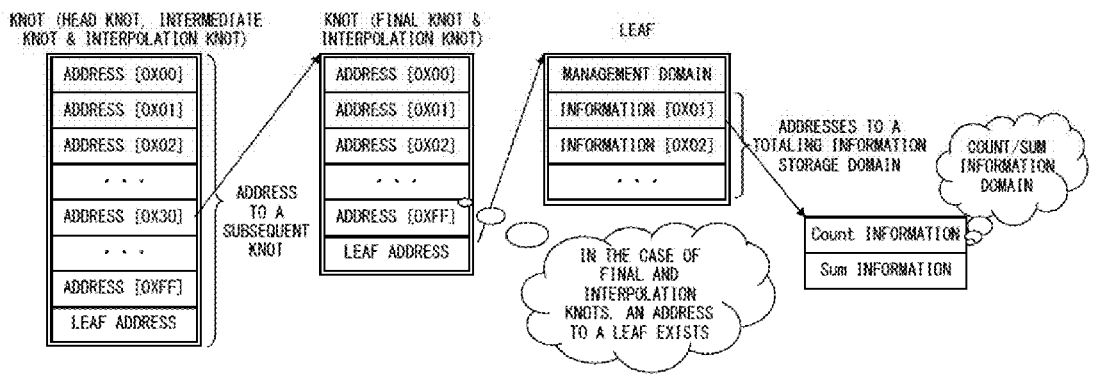
FIG. 9 is an example of the detailed configuration of a knot and a leaf.

FIG. 9 is an example of the detailed configuration of a knot and a leaf.

A knot used in this preferred embodiment includes a knot storage domain which stores the address information of a storage domain which stores a subsequent knot to be related and a leaf storage domain which stores the address information of a storage domain which stores a leaf to be related.

In the case of an intermediate knot, only the knot storage domain is used. The knot storage domain is composed of 0xFF continuous arrays (address [0x00]-address [0xFF]). Hereinafter, these arrays are called "knot arrays". Then, the array number of a knot array and a dividing border value coded by a process in step S505, which will be described later, are related.

Hereinafter, a dividing border value coded by a process in step S505, which will be described later, is called "dividing border value code".

The totaling apparatus 100 stores the address of a storage domain which stores a subsequent knot or leaf to be related. For example, when the dividing border value code is 0x30, the totaling apparatus 100 stores the address of a storage domain which stores a subsequent knot or leaf to be related in the address for knot arrays [0x30].

In the case of a final knot, only the leaf storage domain is used. The totaling apparatus 100 stores the address of a storage domain which stores a leaf in the leaf storage domain.

In the case of an interpolation knot, the knot storage domain and the leaf storage domain are used as required. Therefore, as to an interpolation knot there are one whose configuration is the same as that of an intermediate knot and one whose configuration is the same as that of a final knot.

A leaf used in this preferred embodiment includes a management domain for managing totaling information and a totaling information storage domain for storing the address of the totaling information storage domain which stores totaling information.

The totaling information storage domain is composed of a plurality of continuous arrays (information [0x00], information [0x01], . . . and so on), as required. The management domain stores the type of information of totaling information of a domain indicated by an array and the like. The type of totaling information is, for example, COUNTER information, SUM information and the like, which will be described later.

Figure 10A:
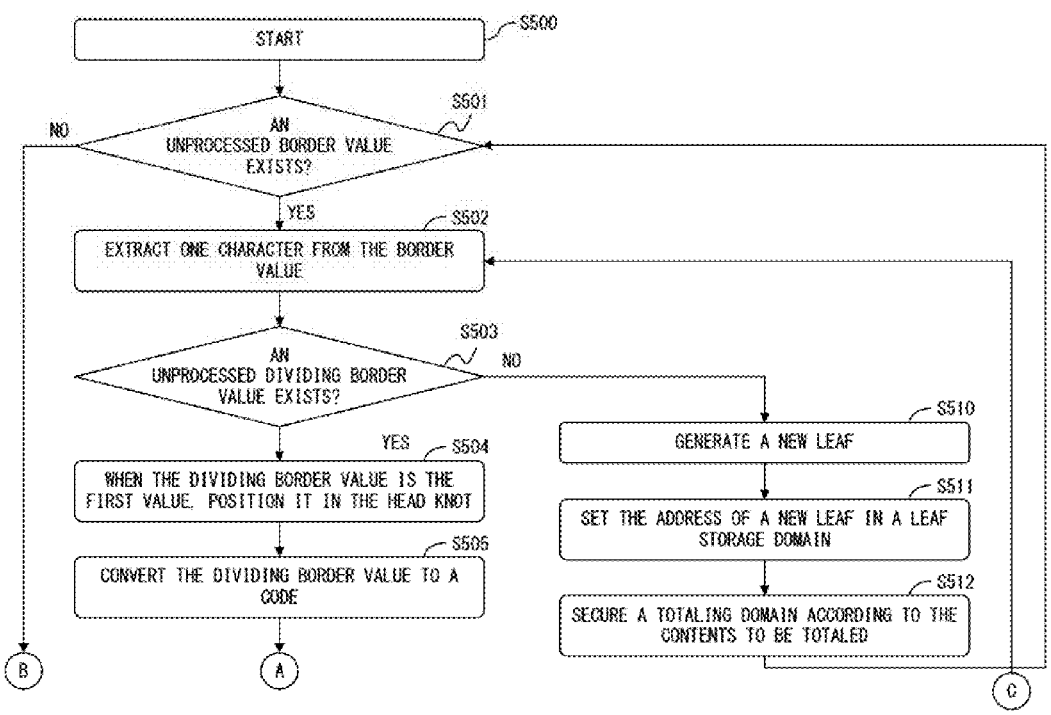
FIG. 10A is a flowchart illustrating the detailed process of a process (step S101) for generating the basic statistic hydra.
Figure 10B:
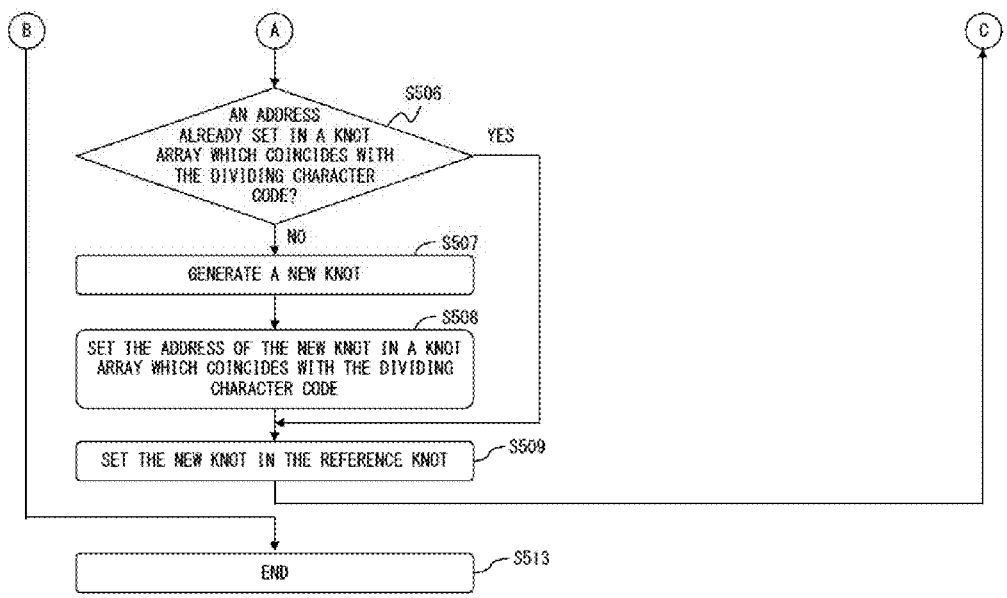
FIG. 10B is a flowchart illustrating the detailed process of a process (step S101) for generating the basic statistic hydra.

FIGS. 10A and 10B are a flowchart illustrating the detailed process of a process (step S101) for generating the basic statistic hydra 200.

In step S501 the totaling apparatus 100 refers to the border value information 201 stored in the memory 1102 or the like. Then, the totaling apparatus 100 checks whether there is an unprocessed border value.

If there is an unprocessed border value, the process of the totaling apparatus 100 advances to step S502 (YES in step S501). If there is no unprocessed border value, the process of the totaling apparatus 100 advances to step S512 (NO in step S501) and it terminates the generation process of the basic statistic hydra 200.

In step S502 the totaling apparatus 100 obtains a border value from the border value information 201. It is assumed that the obtained border value is data handled as a character string. Then, the totaling apparatus 100 extracts one character indicating the highest-order value of the unprocessed characters. Hereinafter, the extracted unprocessed character is called "dividing border value".

If in step S503 there is an unprocessed dividing border value, the process of the totaling apparatus 100 advances to step S504 (YES in step S503).

If in step S504 the dividing border value is the first value of border values, the totaling apparatus 100 sets a head knot in the knot of a reference destination. Hereinafter, the knot of a reference destination is called "reference knot". If the dividing border value is not the first value of a border value, the totaling apparatus 100 performs no process.

In this case, the first value means the highest-order value of a border value of dividing border values obtained by dividing a character string constituting the border value into respective characters. For example, when a border value is "123", a character "1" indicating the highest-order value is the first value.

In step S505 the totaling apparatus 100 generates a dividing border value code by coding a dividing border value according to a predetermined rule. In this preferred embodiment, a dividing border value is converted to a one-byte hexadecimal code according to ASCII (American standard code for information interchange) code table.

For example, the totaling apparatus 100 converts a dividing border value "0" to a dividing border value code "0x30".

In step S506 the totaling apparatus 100 determines whether in the reference knot the address of a storage domain which stores a knot is already set in the knot array of an array number coinciding with a dividing border value code.

If the address of a storage domain which stores a knot is already set in the knot array of an array number coinciding with a dividing border value code, the process of the totaling apparatus 100 advances to step S509 (YES in step S506).

If the address of a storage domain which stores a knot is not set in the knot array of an array number that coincides with the dividing border value code yet, the process of the totaling apparatus 100 advances to step S507 (NO in step S506).

In step S507 the totaling apparatus 100 generates a new knot on the memory 1102.

In step S508 the totaling apparatus 100 sets the address of a storage domain which stores the new knot generated in step S507 in the knot array of an array number that coincides with the dividing border value code.

In step S509 the totaling apparatus 100 sets the new knot generated in step S507 in the reference knot. After the setting is completed, the process of the totaling apparatus 100 returns to step S502. Then, the totaling apparatus 100 performs the processes in steps S502 through S509.

If in step S503 there is no unprocessed dividing border value, the process of the totaling apparatus 100 advances to step S510 (No in step S503).

In step S510 the totaling apparatus 100 generates a leaf on the memory 1102.

In step S511 the totaling apparatus 100 sets the address of a storage domain which stores the new leaf generated in step S510 in the leaf storage domain of the reference knot.

In step S512 the totaling apparatus 100 generates one or more than two domains for storing COUNT information, SUM information and the like in the totaling information storage domain according to the contents to be totaled. In this preferred embodiment, it generates a COUNT domain for storing the number of totaled persons and a SUM domain for storing a total score in the totaling information storage domain.

Furthermore, the totaling apparatus 100 sets the address of the totaling information storage domain storing the generated totaling domains in the new leaf generated in step S510. Then, the process of the totaling apparatus 100 returns to step S501.

Although in this preferred embodiment, in step S505 the dividing border value is converted to an ASCII code, which is not restrictive of the invention. It can be also converted to another character code, such as a Shift_JIS (Japanese industrial standards) code, EUC (extended UNIX code) or the like, as required. Furthermore, it is not always necessary for the dividing border value code to be a character code expressed by one byte.

Figure 11:
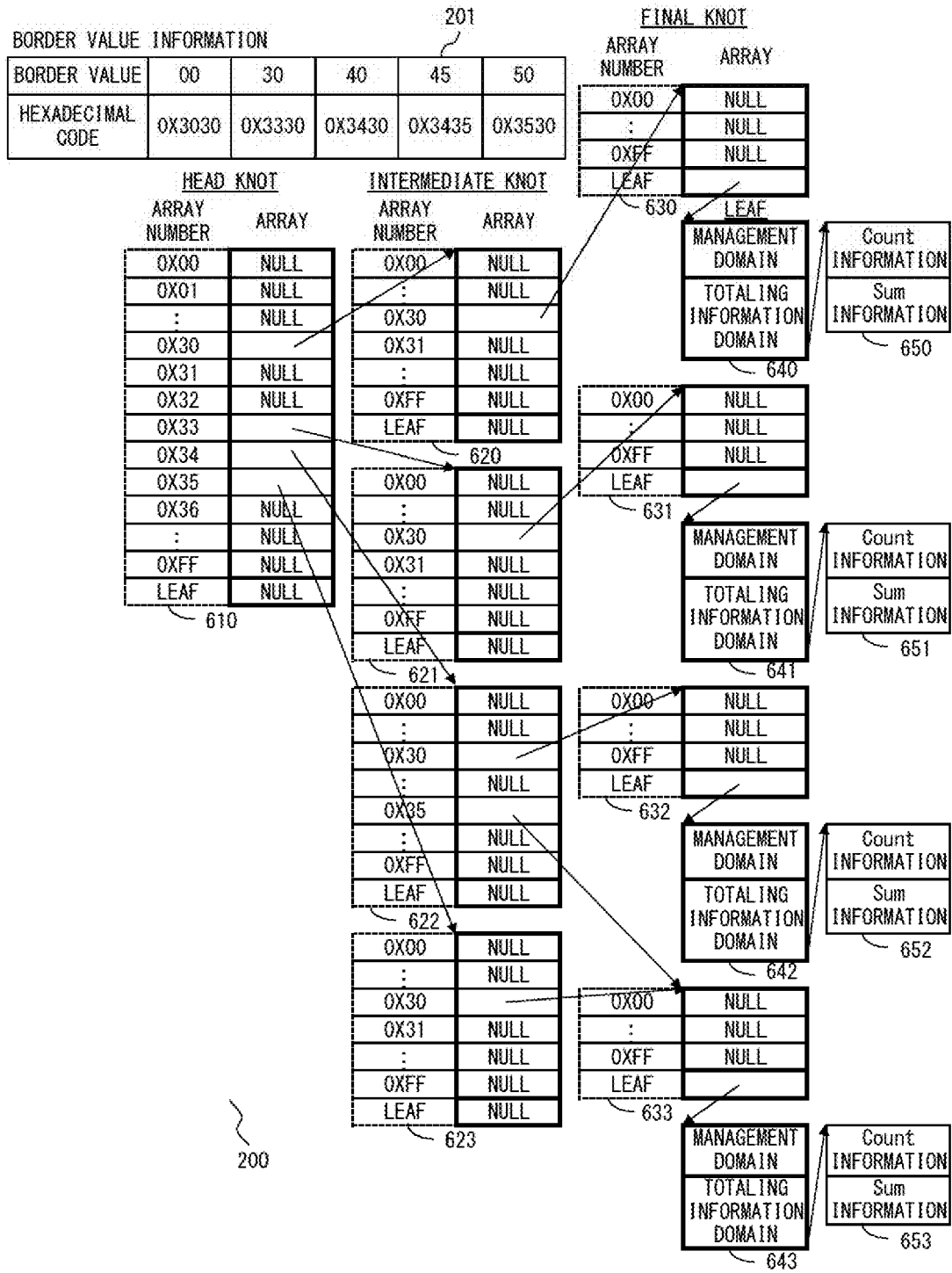
FIG. 11 explains the detailed basic statistic hydra.

FIG. 11 explains the detailed basic statistic hydra 200. The basic statistic hydra 200 illustrated in FIG. 11 is the basic statistic hydra of the evaluation table 1300 generated according to the flowchart illustrated in FIGS. 10A and 10B.

The border value information 201 is converted according to a hexadecimal ASCII code table. As illustrated in FIG. 11, border values "00", "30", "40", "45" and "50" become "0x3030", "0x3330", "0x3430", "0x3435" and "0x3530", respectively.

The basic statistic hydra 200 illustrated in FIG. 11 includes a head knot 610, intermediate knots 620-623 and final knots 630-633.

Each of the head knot 610, the intermediate knots 620-623 and the final knots 630-633 includes a knot storage domain composed of the continuous arrays of array numbers 0x00 through 0xFF and a leaf storage domain.

The head knot 610 is the knot of the dividing border value code of a value in the ten place of a border value. The array number of the head knot 610 corresponds to the dividing border value code of a value in the ten place of a border value. Then, the head address of a storage domain storing the knot of the dividing border value code of a value in the one place following to a value in the ten place of a border value indicated by a dividing border value code which coincides with the array number is stored in each array of the knot storage domain.

Thus, the array number of the head knot 610 and the intermediate knots 620 through 623 are related.

The intermediate knots 620 through 623 are the knots of the dividing border value code of a value in the one place of a border value. The array numbers of the intermediate knots 620 through 623 correspond to the dividing border value code of a value in the one place of a border value. Then, the address of a storage domain storing the final knots 630 through 633 is stored in each array of the knot storage domain.

Thus, the array number of the intermediate knots 620 through 623 and the final knots 630 through 633 are related.

The totaling information of a range to which a border value related to itself belongs, that is, the address of a storage domain which stores a leaf storing the totaling information of a range to which a border value indicated by a code composed of the array number of the array of an intermediate knot related to a final knot and the array number of the array of a head knot related to the intermediate knot belongs is stored in the leaf storage domain of the final knots 630 through 633.

For example, as to the final knot 631, the address of a storage domain which stores a leaf 641 storing the totaling information of an range between 30 and 40 to which a border value 30 expressed by a code 0x3330 composed of the array number 0x30 of the array of the intermediate knot 621 related to the final knot 631 and the array number 0x33 of the array of the head knot 610 related to the intermediate knot 621 belongs is stored.

The address of a totaling information storage domain storing totaling information 650 through 653 is stored in the totaling information storage domain of leaves 640 through 643. The totaling information 650 through 653 is composed of COUNT information being the totaling information of the number of persons and SUM information being the totaling information of a total score.

It can be composed of one or more than two pieces of information, such as COUNT information, SUM information, AVG information being the information of an average score, MAX information being the information of the maximum score, MIN information being the information of the minimum score, as required.

For example, the array number 0x33 of the head knot 610 corresponds to the dividing border value code 0x33 of a value in the ten place of the border value 30. Then, the head address of a storage domain storing the intermediate knot 621 of the dividing border value code of a value 0 in the one place following to a value 3 in the ten place of a border value indicated by a dividing border value code which coincides with the array number 0x33 is stored in the array of the array number 0x33.

The array number 0x30 of the intermediate knot 621 corresponds to the dividing border value code 0x30 of a value in the one place of the border value 30. Then, the head address of a storage domain storing the final knot 631 is stored in the array of the array number 0x30.

The head address of a storage domain which stores the leaf 631 storing the totaling information of the border value 30 expressed by a code 0x3330 composed of the array number 0x30 if the intermediate knot related to the final knot and the array number 0x33 of a head knot related to the intermediate knot is stored in the leaf storage domain of the final knot 631.

As to the leaves 640 through 643 and the totaling information storage domain, since they have been explained with reference to FIG. 9, their detailed explanations are omitted here.

Figure 12A:
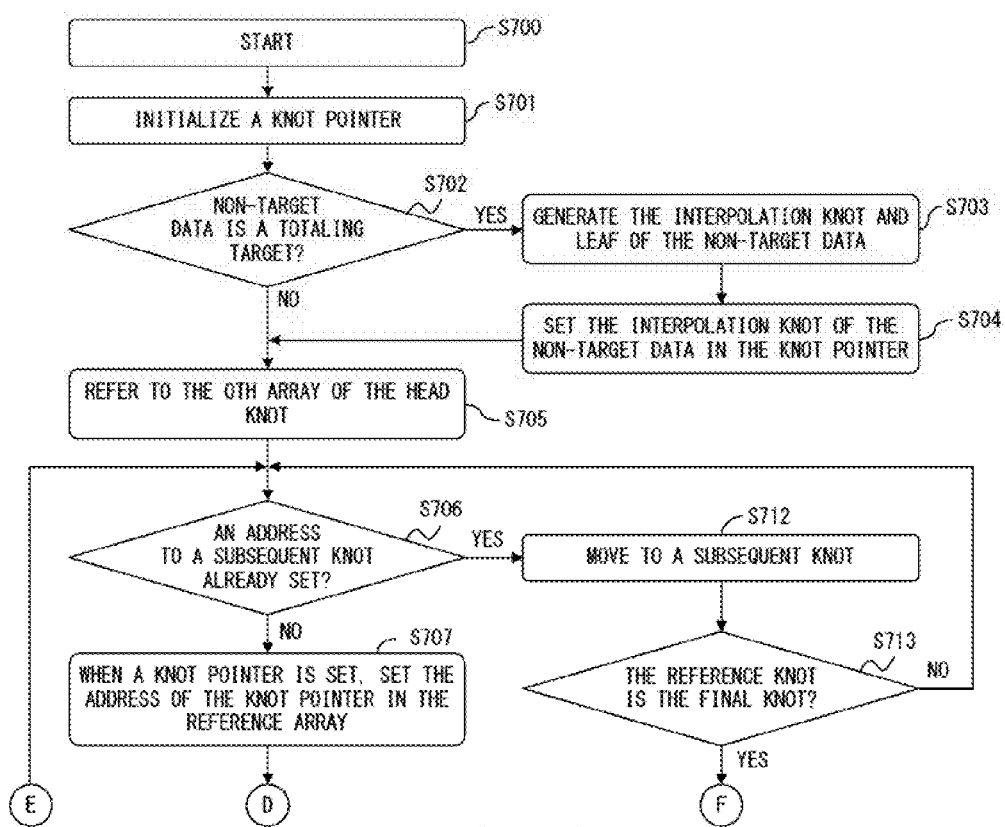
FIG. 12A is a flowchart illustrating the detailed process of a process (step S102) for generating the statistic hydra.
Figure 12B:
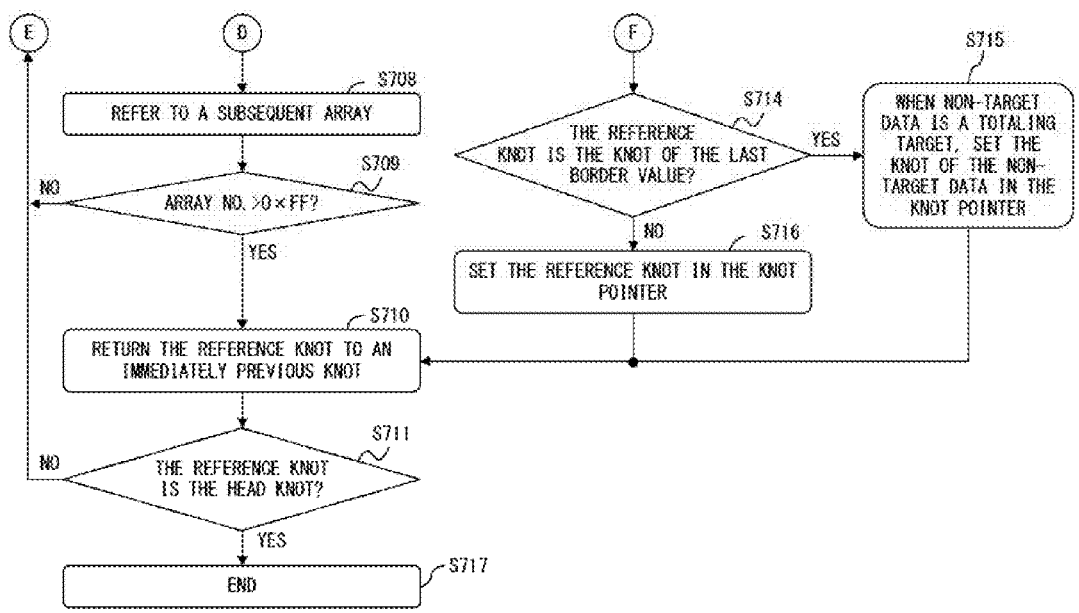
FIG. 12B is a flowchart illustrating the detailed process of a process (step S102) for generating the basic statistic hydra.

FIGS. 12A and 12B are a flowchart illustrating the detailed process of a process (step S102) for generating the statistic hydra 300.

In step S701 the totaling apparatus 100 initializes a variable which temporarily stores the address of a storage domain storing a knot with, for example, a value 0. Hereinafter, the variable which temporarily stores the address of a storage domain storing a knot is called "knot pointer".

When the knot pointer is set to a value 0, the totaling apparatus 100 determines that the knot pointer is not set.

In step S702 the totaling apparatus 100 determines whether non-target data is a totaling target. The "non-target data" means data out of a totaling target range. For example, a score out of the range of a range evaluation table 1300 is non-target data.

Whether non-target data is made a totaling target is preset by the user of the totaling apparatus 100. The setting is stored in a predetermined storage domain of an external storage device 1105 provided for the totaling apparatus 100. Therefore, the totaling apparatus 100 determines whether non-target data is a totaling target, referring to the storage domain.

If it is determined that non-target data is a totaling target, the process of the totaling apparatus 100 advances to step S703 (YES in step S702). If it does not determine that non-target data is a totaling target, the process of the totaling apparatus 100 advances to step S705 (NO in step S702).

In step S703 the totaling apparatus 100 generates an interpolation knot of the non-target data and the leaf of the interpolation knot on the memory 1102.

Then, the totaling apparatus 100 stores the head address of a storage domain storing the interpolation knot generated in step S703 in the array of the array number out of the totaling range of the array numbers of a head knot 810. Furthermore, the totaling apparatus 100 stores the head address of a storage domain storing the leaf generated in step S703 in the leaf storage domain of the interpolation knot. Then, the totaling apparatus 100 sets the interpolation knot in the knot pointer.

In step S704 the totaling apparatus 100 sets the interpolation knot of the non-target data generated in step S703 in the knot pointer. Then, the process of the totaling apparatus 100 advances to step S705.

In step S705 the totaling apparatus 100 sets the reference knot in ahead knot. Then, it refers to the 0-th array of the head knot. Hereinafter, an array to which the totaling apparatus 100 refers is called "reference array".

In step S706 the totaling apparatus 100 determines whether the address of a storage domain storing a subsequent knot is already set in the reference array referenced in step S705.

If it is determined that the address is not set yet, the process of the totaling apparatus 100 advances to step S707 (NO in step S706).

In step S707 the totaling apparatus 100 sets the address set in the knot pointer in the reference array. If the address storing the knot is not set in the knot pointer, the totaling apparatus 100 does not performs step S707.

In step S708 the totaling apparatus 100 refers to a subsequent array. Specifically, the totaling apparatus 100 increments the array number of the reference array by one and refers to the array of the array number that is incremented by one. Hereinafter, this array to be referenced is made a new "reference array".

In step S709 the totaling apparatus 100 compares the array number of the reference array with a value "0xFF". If the array number of the reference array is equal to or less than 0xFF, the process of the totaling apparatus 100 returns to step S706 (NO in step S709).

If in step S709 the array number of the reference array is more than 0xFF, the process of the totaling apparatus 100 advances to step S710 (YES in step S709).

In step S710 the totaling apparatus 100 returns the reference knot to an immediately previous knot. The immediately previous knot means a reference knot immediately before the current reference knot.

In step S711 the totaling apparatus 100 determines whether the reference knot is a head knot. If the reference knot is a head knot, the process of the totaling apparatus 100 advances to step S717 (YES in step S711) and the generation process of the statistic hydra 300 is terminated.

If in step S711 the reference knot is not a head knot, the process of the totaling apparatus 100 returns to step S706 (NO in step S711).

However, if in step S706 it is determined that the address is already set, the process of the totaling apparatus 100 advances to step S712 (YES in step S706).

In step S712 the totaling apparatus 100 moves the reference knot to a subsequent knot. In this case, a subsequent knot means the knot of an address stored in the reference array.

In step S713 the totaling apparatus 100 determines whether the reference knot is a final knot. If the reference knot is not a final knot, the process of the totaling apparatus 100 returns to step S706 (NO in step S713). If the reference knot is a final knot, the process of the totaling apparatus 100 advances to step S714 (YES in step S713).

In step S714 the totaling apparatus 100 determines whether the reference knot is the knot of the last border value.

Whether the reference knot is the knot of the last border value is determined by whether a border value composed of a knot related to the reference knot is the last border value. In this case, the last border value means the maximum border value.

For example, a border value composed of a head knot 810 related to the final knot 633 and the intermediate knot 623 is a value obtained by decoding a value "0x3530" composed of the array number of the head knot 810 and the array number of the intermediate knot 623, that is, 50.

When referring to the border value information 201, the totaling apparatus 100 determines the border value 50 is the last border value since it is the maximum one of border values included in the border value information 201.

If in step S714 it is determined that the reference knot is the knot of the last border value, the process of the totaling apparatus 100 advances to step S715 (YES in step S714).

In step S715 the totaling apparatus 100 sets the interpolation knot of the non-target data generated in step S703 in the knot pointer, However, if in step S702 it does not determine that non-target data is a totaling target, it does not perform step S715.

If in step S714 it is determined that the reference knot is not the knot of the last border value, the process of the totaling apparatus 100 advances to step S716 (NO in step S714).

In step S716 the totaling apparatus 100 sets the reference knot in the knot pointer, specifically, sets the address of a storage domain storing the reference knot in the knot pointer.

After the process in step S715 or 5716 is completed, the process of the totaling apparatus 100 returns to step S710.

FIG. 13 explains the detailed statistic hydra 300. The statistic hydra 300 illustrated in FIG. 13 is one generated by interpolating the basic statistic hydra 200 illustrated in FIG. 11 according to the flowchart illustrated in FIGS. 12A and 12B.

The statistic hydra 300 illustrated in FIG. 13 includes a head knot 810, intermediate knots 820-823 and final knots 830-833.

Each of the head knot 810, the intermediate knots 820-823 and the final knots 830-833 includes a knot storage domain composed of the continuous arrays of array numbers 0x00 through 0xFF and a leaf storage domain.

The head knot 810 is the knot of the dividing border value code of a value in the ten place of a border value and the dividing border value code of a value in the ten place of an interpolation value obtained by interpolating values between border values.

The array number of the head knot 810 corresponds to the dividing border value code of a value in the ten place of a border value or an interpolation value.

The head address of a storage domain which stores the intermediate knot of the dividing border value code of a value in the one place following a value in the ten place of a border value indicated by a dividing border value code coinciding with an array number or the final knot of a border value to which an interpolation value belongs is stored in each array of the knot storage domain.

In this case, the "border value to which an interpolation value belongs" means the border value belonging to a range to which an interpolation value belongs, of two border values for specifying the range. When both the two border values for specifying a range to which an interpolation value belong to the range, it is OK if it is predetermined which of the border values should be a "border value to which an interpolation value belongs".

For example, an interpolation value 10 which can interpolate values between border values 00 and 30 belongs to a range between border values 00 and 30. The border value belonging to this range is 00. Therefore, the border value to which this interpolation value belongs is 00 and the final knot of a border value to which the interpolation value 10 belongs is the final knot 830.

Similarly, the final knots of a border value to which interpolation values 11 through 19 and 20 through 29 belongs is the final knot 830.

Therefore, the head address of a storage domain which stores the final knot 830 of a border value belonging to the interpolation values 10 through 19 is stored in the array of the array number 0x31 of the head knot 810. Similarly, the head address of a storage domain which stores the final knot 830 of a border value belonging to the interpolation values 20 through 29 is stored in the array of the array number 0x32 of the head knot 810.

Thus, the array number of the head knot 810 and the intermediate knots 820 through 823 or the final knots 830 through 833 are related.

The intermediate knots 820 through 823 are the interpolation knots of the dividing border value code of a value in the one place of a border value and the dividing border value code of a value in the one place of an interpolation value obtained by interpolating values between border values.

The array numbers of the intermediate knots 820 through 823 correspond to the dividing border value code of a value in the one place of a border value or an interpolation value.

The head address of a storage domain which stores a final knot of the totaling information of a range to which a border value composed of a value in the one place of a border value indicated by a dividing border value code coinciding with a array number and a value in the ten place of a border value indicated by the array number of the head knot 810 related to an intermediate knot belonging to the array belongs is stored in each array of the knot storage domain.

For example, a border value composed of a value 1 in the one place indicated by a dividing border value code which coincides with the array number 0x31 of the intermediate knot 821 and a value 3 in the ten place of a border value indicated by the array number 0x33 of the head knot 810 related to the intermediate knot 821 to which the array belongs is 31.

The head address of a storage domain storing the final knot 831 of the totaling information of a range to which the border value 31 belongs is stored in the array of the array number 0x31 of the intermediate knot 821.

As to the final knots 830 through 833, since it is the same as that of the final knots 630 through 633 illustrated in FIG. 11, its explanation is omitted here.

Figure 14A:
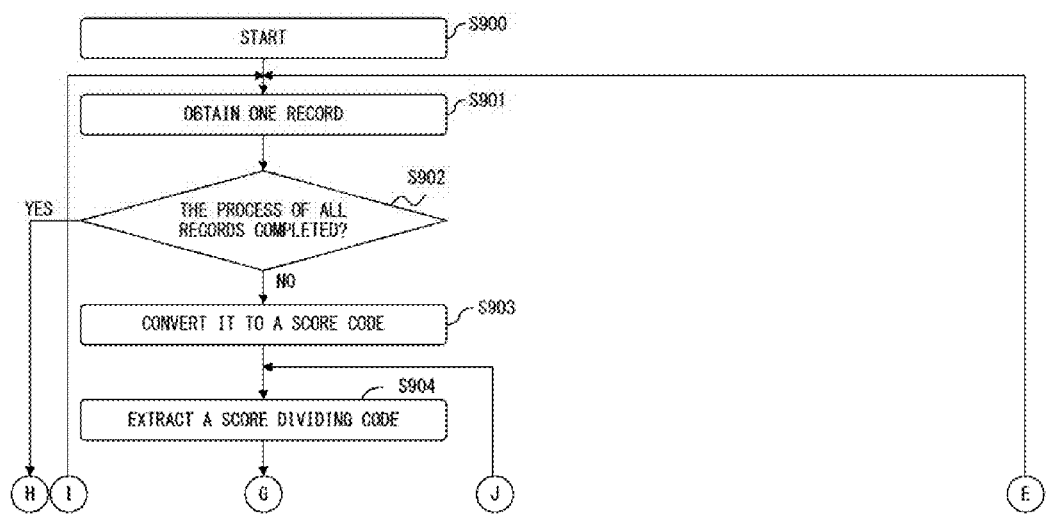
FIG. 14A is a flowchart illustrating a totaling process (step S103) using statistic hydra.
Figure 14B:
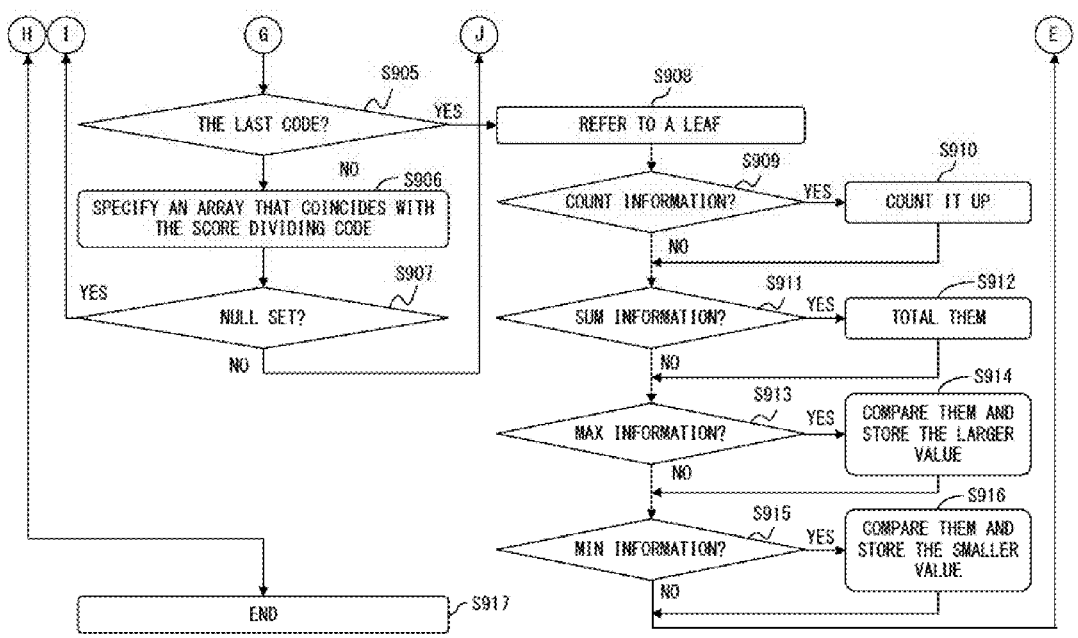
FIG. 14B is a flowchart illustrating a totaling process (step S103) using statistic hydra.

FIGS. 14A and 14B are a flowchart illustrating a totaling process (step S103) using the statistic hydra 300.

When a user specifies test result data 1200, using an input device 1103 provided for the totaling apparatus 100 and also instructs the start of a totaling process, the totaling apparatus 100 starts the totaling process (step S900). In this case, it is assumed that the reference knot is initially set in the head knot.

In step S901 the totaling apparatus 100 obtains one record from the test result data 1200. In this preferred embodiment, one piece of data composed of the combination of a "name" and a "score" which are registered in the test result data 1200 is called "record".

In step S902 the totaling apparatus 100 determines whether a totaling process has been applied to all records registered in the test result data 1200.

If it is determined that a totaling process has been applied to all records registered in the test result data 1200, the process of the totaling apparatus 100 advances to step S917 and the totaling process is terminated (YES in step S902). In this case, the totaling result 1600 illustrated in FIG. 5 is obtained.

If it is determined that there is one to which a totaling process has not been applied, of the records registered in the test result data 1200, the process of the totaling apparatus 100 advances to step S903 (NO in step S902).

In step S903 the totaling apparatus 100 converts the score of a record obtained in step S901 to a hexadecimal code according to the ASCII code table. Hereinafter, this code is called "score code".

In step S904 the totaling apparatus 100 obtains one byte of code from the score code. In this case, in step S904 it obtains one byte of code in descending order from higher one to lower one. Therefore, when executing step S904 next time, it obtains one byte of code in the second highest order to the code obtained this time. Hereinafter, this code is called "score dividing code".

In step S905 the totaling apparatus 100 determines whether the score dividing code is the last score dividing code obtained from a score code, that is, a score dividing code of the lowest-order byte.

If it is determined that a score dividing code is the last score dividing code obtained from a score code, the process of the totaling apparatus 100 advances to step S908 (YES in step S905).

If it does not determine that a score dividing code is the last score dividing code obtained from a score code, the process of the totaling apparatus 100 advances to step S906 (NO in step S905).

In step S906 the totaling apparatus 100 refers to the knot of the statistic hydra 300 set as the reference knot and specifies an array coinciding with the score dividing code. In this case, if the score dividing code is the score code of the highest-order byte, the totaling apparatus 100 refers to the head knot of the statistic hydra 300.

In step S907 the totaling apparatus 100 determines whether NULL is set in the array specified in step S906.

If NULL is set in the array specified in step S906, the process of the totaling apparatus 100 returns to step S901. Then, the totaling apparatus 100 obtains a subsequent record from the test result data 1200 (YES in step S907).

If NULL is not set in the array specified in step S906, the totaling apparatus 100 sets the knot of an address set in the array specified in step S906 in the reference knot and the process of the totaling apparatus 100 returns to step S904. Then, the totaling apparatus 100 obtains the code of the second lowest-order one byte to dividing border value code and specifies this obtained code as a new score dividing code (NO in step S907).

In step S908 the totaling apparatus 100 obtains the address of a leaf from the leaf storage domain of the reference knot. Then, the totaling apparatus 100 refers to the leaf.

In step S909 the totaling apparatus 100 determines whether totaling information stored in an address stored in the totaling information storage domain of the leaf is COUNT information. In this preferred embodiment it is assumed that information for specifying the type of totaling information is set in the management domain of the leaf. Therefore, the totaling apparatus 100 determines the type of the totaling information according to information set in the management domain of the leaf. This also applies to steps S911, S913 and S915.

If it is determined that the totaling information is COUNT information, the process of the totaling apparatus 100 advances to step S910 (YES in step S909). Then, the totaling apparatus 100 counts up a total value by one.

If it is determined that the totaling information is not COUNT information, the process of the totaling apparatus 100 advances to step S911 (NO in step S909).

In step S911 the totaling apparatus 100 determines whether the totaling information stored in the address stored in the totaling information storage domain of the leaf is SUM information.

If it is determined that the totaling information is SUM information, the process of the totaling apparatus 100 advances to step S912 (YES in step S911). Then, the totaling apparatus 100 adds the score of the record obtained in step S901 to the SUM information.

If it is not determined that the totaling information is SUM information, the process of the totaling apparatus 100 advances to step S913 (NO in step S911).

In step S913 the totaling apparatus 100 determines whether the totaling information stored in the address stored in the totaling information storage domain of the leaf is MAX information.

If it is determined that the totaling information is MAX information, the process of the totaling apparatus 100 advances to step S914 (YES in step S913). Then, the totaling apparatus 100 compares the score obtained in step S901 with the MAX information. If the score obtained in step S901 is larger than the MAX information, it stores the score obtained in step S901 as new MAX information.

If it determines that the totaling information is not MAX information, the process of the totaling apparatus 100 advances to step S915 (NO in step S913).

In step S915 the totaling apparatus 100 determines whether the totaling information stored in the address stored in the totaling information storage domain of the leaf is MIN information.

If it is determined that the totaling information is MIN information, the process of the totaling apparatus 100 advances to step S916 (YES in step S915). Then, the totaling apparatus 100 compares the score obtained in step S901 with the MIN information. Then, if the score obtained in step S901 is smaller than the MIN information, it stores the score obtained in step S901 as new MIN information.

If it is not determined that the totaling information is MIN information, the process of the totaling apparatus 100 returns to step S901 (NO in step S915).

Figure 15:
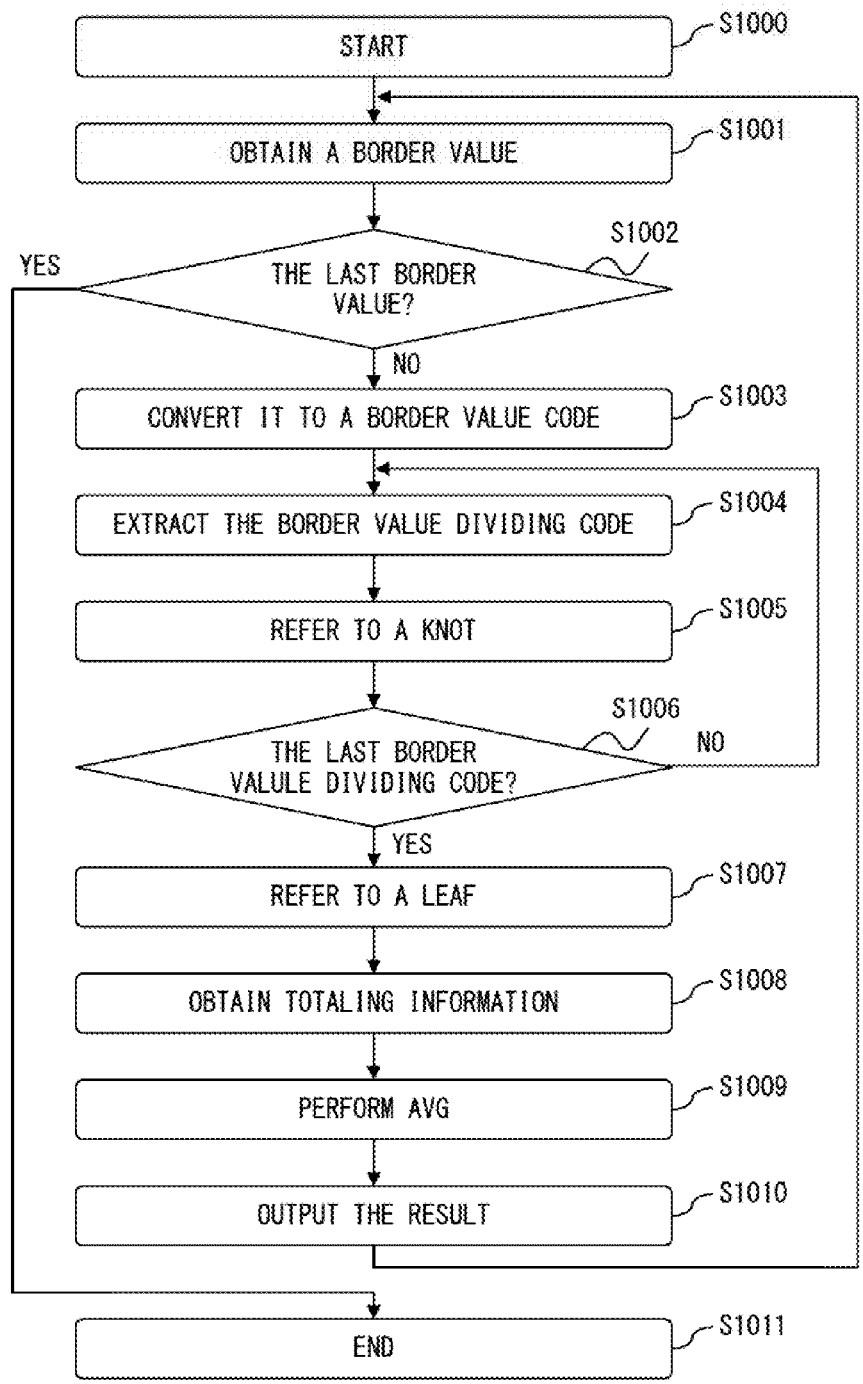
FIG. 15 is a flowchart illustrating the output process of a totaling result (step S104).

FIG. 15 is a flowchart illustrating the output process of a totaling result (step S104).

After the totaling process illustrated in FIGS. 14A and 14B is completed, the totaling apparatus 100 starts the output process of the totaling result (step S1000).

In step S1001 the totaling apparatus 100 obtains one border value from the border value information 201. In step S1001 it obtains a border value from the border value information 201 in ascending order. Therefore, when executing step S1001 next time, it obtains the second smallest border value to one obtained in step S1001 this time.

In step S1002 the totaling apparatus 100 determines whether the border value obtained in step S1001 is the last one. The last border value means one lastly obtained, of border values to be obtained in step S1001, that is, the largest one in the border value information 201.

If it is determined that it is the last border value, the process of the totaling apparatus 100 advances to step S1011 and the totaling result output process is terminated (YES in step S1002).

If it is not determined that it is the last border value, the process of the totaling apparatus 100 advances to step S1003 (NO in step S1002).

In step S1003 the totaling apparatus 100 converts the border value obtained in step S1001 to a hexadecimal code according to the ASCII code table. Hereinafter, this code is called "border value code".

In step S1004 the totaling apparatus 100 obtains one byte of code, that is, a dividing border value code from the border value code. In step S1004 it obtains one byte of code in descending order. Therefore, when executing step S1004 next time, it obtains one byte of code the second highest to the code obtained in step S1004 this time.

In step S1005 the totaling apparatus 100 refers to the knot of the statistic hydra 300 set as the reference knot and specifies an array coinciding with the dividing border value code. Then, it sets the knot of an address set in the specified array as the reference knot.

In this case, if the dividing border value code is the highest-order byte of code in the border value code, the totaling apparatus 100 refers to the head knot of the statistic hydra 300.

In step S1006 the totaling apparatus 100 determines whether the dividing border value code is the last code of the border value code, that is, the lowest-order byte of code.

If it is not determined that the dividing border value code is the last code, the process of the totaling apparatus 100 advances to step S1004 (NO in step S1006). Then, the processes in steps S1004 through S1006 are performed.

If it is determined that the dividing border value code is the last code, the process of the totaling apparatus 100 advances to step S1007 (YES in step S1006).

In step S1007 the totaling apparatus 100 refers to the leaf of an address set in the leaf storage domain of the reference knot. Then, it obtains the addresses of one or more than two domains storing totaling information from the totaling information storage domain of the leaf.

In step S1008 the totaling apparatus 100 obtains, for example, COUNT information, SUM information, MAX information and MIN information from the domain of the address obtained in step S1007.

In step S1009 the totaling apparatus 100 calculates an average score (AVG information=SUM information/COUNT information) on the basis of the SUM information and COUNT information that are obtained in step S1008.

In step S1010 the totaling apparatus 100 outputs the obtained/calculated information in steps S1008 and S1009 to a display device, a data file, a storage device and the like. Then, the process of the totaling apparatus 100 returns to step S1001.

Although in step S1001 a border value is obtained in descending order, this is not restrictive of the invention. For example, a border value is obtained in ascending order. In this case, the last border value to be determined in step S1002 is the largest border value.

FIG. 16 is a configuration example of totaling apparatus 100.

The totaling apparatus 100 illustrated in FIG. 16 includes a CPU 1101 for executing a program for realizing a totaling process besides executing peripheral devices and various types of software, volatile memory 1102 used to execute programs (for example, RAM), an input device 1103 for inputting data from outside (for example, a keyboard and a mouse), an output device 1104 for displaying data and the like, an external storage device 1105 for recording the program for realizing the totaling process besides programs and data needed to operate the totaling apparatus 100 and a medium drive device 1106 for outputting the data of the memory 1102 and the external storage device 1105 to a portable storage medium 1107 (for example, a floppy disk, an MO disk, CD-R, DVD-R and the like) or reading the program, the data and the like from the portable storage medium 1107. These devices are connected to a bus 1100 and data can be transmitted/received to/from each other.

Alternatively, the totaling apparatus 100 can include a network connection device 1108 connected to a network and a totaling result can be outputted to another information processing device and an external storage device via the network.

Although in the above explanation, in the basic statistic hydra 200 and the statistic hydra 300, a knot storage domain is composed of the continuous arrays of array numbers 0x00 through 0xFF for the purpose of simple mounting, this is not restrictive of the invention.

For example, the knot storage domain can also be composed of continuous arrays of array numbers 0x00 through 0x40. Alternatively, the knot storage domain can be composed of continuous arrays of array numbers 0x00 through 0x09 and the array numbers and the dividing border values can be made to correspond to each other.

Alternatively, the leaves 640 through 643 and totaling information 650 and 651 can be included in the basic statistic hydra 200. Similarly, the leaves 840 through 843 and totaling information 650 and 651 can be included in the statistic hydra 300.

Furthermore, the head knot 610 and the intermediate knots 620 through 623 do not use the leaf storage domain. Therefore, in the case of a knot used as the head knot 610 and the intermediate knots 620 through 623, there is no need to secure the leaf storage domain. This also applies to the head knot 810 and the intermediate knots 820 through 823.

Furthermore, the final knots 630 through 633 do not use the knot storage domain. Therefore, in the case of a knot used as the final knots 630 through 633, there is no need to secure the knot storage domain. This also applies to the final knots 830 through 833.

Furthermore, that the basic statistic hydra 200 and the statistic hydra 300 have hierarchical structures means that they have conceptual layered structures and does not mean that they have layered structures physically. For example, it does not mean that the basic statistic hydra 200 stored on the memory 1102 have to have a hierarchical structure.

As explained above, by performing a totaling process using the statistic hydra 300, a desired totaling result can be obtained without performing a process other than the primary totaling process illustrated in FIGS. 14A and 14B, such as a secondary totaling process and the like.

As a result, since a totaling process can be efficiently performed, process time can be shortened.

Furthermore, since no process is needed other than a primary totaling process, useless memory consumption, such as memory capacity necessary for a secondary totaling process and the like, can be suppressed. For the similar reason, the consumption of memory and an external storage device used as a work domain can be also suppressed.

Similarly, since no process other than a primary totaling process is needed, no generation of a batch file and application software for performing a secondary totaling process and the like is needed. Therefore, compared with the execution of the conventional totaling process, cost can be also suppressed.

As illustrated in FIGS. 11 and 13, by totaling using the basic statistic hydra 200 and the statistic hydra 300, as in the evaluation table 1300 and the like, data can be totaled/retrieved for each desired classification range.

According to this preferred embodiment, as to totaling target information being a totaling target, a second storage unit related to a first dividing information which coincides with a first totaling dividing information or a third storage unit related to a first interpolation value dividing information which coincides with a first totaling dividing information is specified.

Then, a third storage unit related to a second dividing information which coincides with a second totaling dividing information or a third storage unit related to a second interpolation value dividing information which coincides with a second totaling dividing information is specified.

Furthermore, a totaling information storage unit is specified according to information stored in the specified third storage unit and the totaling information of totaling target information is stored in the totaling information storage unit.

Therefore, by performing a process other than the above-described series of primary processes, such as a secondary totaling process, in order to obtain a desired totaling result, a desired totaling result can be obtained.

As explained above, by the disclosed totaling method, an efficient totaling process can be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory storage medium on which is recorded a program for enabling a computer, to execute processes, the processes comprising: a first specification process for referring to the first storage unit in a totaling storage unit which comprises a first storage unit for storing first dividing information which is border value information for specifying a desired range and is obtained by dividing border value information belonging to the desired range in a first dividing position and first interpolation value dividing information obtained by dividing interpolation value information obtained by interpolating a value in the desired range of other than the border value information in the first dividing position, a second storage unit for storing second dividing information obtained by dividing the border value information in a second dividing position adjacent to the first dividing position in a certain direction and second interpolation value dividing information obtained by dividing the interpolation value information in the second dividing position and a third storage unit for storing information of a totaling information storage unit for storing totaling information of a range to which the border value information belongs and in which the first storage unit has relation information between the first dividing information and the second storage unit and relation information between the first interpolation value dividing information and the third storage unit and the second storage unit has relation information between the second dividing information and the third storage unit and relation information between the second interpolation value dividing information and the third storage unit and specifying the second storage unit related to the first dividing information which coincides with first total dividing information obtained by dividing totaling target information being totaling target in the first dividing position or the third storage unit related to the first interpolation value dividing information which coincides with the first total dividing information; a second specification process for referring to the second storage unit and specifying the third storage unit related to the second dividing information which coincides with second total dividing information obtained by dividing the totaling target information in the second dividing position or the third storage unit related to the second interpolation value dividing information which coincides with the second total dividing information; and a totaling process for specifying a totaling information storage unit according to information stored by third storage unit specified by the first or second specification process and storing totaling information of the totaling target information in the totaling information storage unit.

2. The non-transitory storage medium according to claim 1, wherein the first dividing information and the first interpolation value dividing information are values obtained by converting information obtained by dividing the border value information and the interpolation value information, respectively, in first dividing position to a hexadecimal code and the second dividing information and the second interpolation value dividing information are values obtained by converting information obtained by dividing the border value information and the interpolation value information, respectively, in second dividing position to a hexadecimal code.

3. The non-transitory storage medium according to claim 1, wherein the first and second dividing information are information obtained by dividing the border value information by a predetermined size and the first and second interpolation value dividing information are information obtained by dividing the interpolation value by a predetermined size.

4. The non-transitory storage medium according to claim 1, wherein the first storage unit comprises a plurality of first continuous arrays and array numbers of the first arrays indicate the first dividing information or first interpolation value dividing information and the second storage unit comprises a plurality of second continuous arrays and array numbers of the second arrays indicate the second dividing information or second interpolation value dividing information.

5. The non-transitory storage medium according to claim 1, wherein the first storage unit comprises a plurality of first continuous arrays and stores relation information between the first dividing information and the second storage unit or relation information between the first interpolation value dividing information and the second storage unit in the first array having an array number which coincides with the first dividing information or the first interpolation value dividing information and the second storage unit comprises a plurality of second continuous arrays and stores relation information between the second dividing information and the third storage unit or relation information between the second interpolation value dividing information and the third storage unit in the second array having an array number which coincides with the second dividing information or the second interpolation value dividing information.

6. A totaling apparatus, comprising:
a first specification unit for referring to the first storage unit in a totaling storage unit which comprises a first storage unit for storing first dividing information which is border value information for specifying a desired range and is obtained by dividing border value information belonging to the desired range in a first dividing position and first interpolation value dividing information obtained by dividing interpolation value information obtained by interpolating a value in the desired range of other than the border value information in the first dividing position, a second storage unit for storing second dividing information obtained by dividing the border value information in a second dividing position adjacent to the first dividing position in a certain direction and second interpolation value dividing information obtained by dividing the interpolation value information in the second dividing position and a third storage unit for storing information of a totaling information storage unit for storing totaling information of a range to which the border value information belongs and in which the first storage unit has relation information between the first dividing information and the second storage unit and relation information between the first interpolation value dividing information and the third storage unit and the second storage unit has relation information between the second dividing information and the third storage unit and relation information between the second interpolation value dividing information and the third storage unit and specifying the second storage unit related to the first dividing information which coincides with first total dividing information obtained by dividing totaling target information being totaling target in the first dividing position or the third storage unit related to the first interpolation value dividing information which coincides with the first total dividing information;
a second specification unit for referring to the second storage unit and specifying the third storage unit related to the second dividing information which coincides with second total dividing information obtained by dividing the totaling target information in the second dividing position or the third storage unit related to the second interpolation value dividing information which coincides with the second total dividing information; and
a totaling unit for specifying a totaling information storage unit according to information stored by third storage unit specified by the first or second specification process and storing totaling information of the totaling target information in the totaling information storage unit.

7. A computer-readable storage medium, comprising:
a first storage unit for storing first dividing information obtained by dividing border value information for specifying a desired range, which belongs to the desired range in a first dividing position;
a second storage unit for storing second dividing information obtained by dividing the border value information in a second dividing position adjacent to the first dividing position in a certain direction; and
a third storage unit for storing information of a totaling information storage unit for storing totaling information of a range to which the border value information belongs, wherein
the first storage unit has relation information between the first dividing information and the second storage unit and
the second storage unit has relation information between the second dividing information and the third storage unit.

8. The storage medium according to claim 7, wherein
the first storage unit stores a first interpolation value dividing information obtained by dividing interpolation value information obtained by interpolating a value in the desired range, other than the border value information, in the first dividing position and has relation information between the first interpolation value dividing information and the third storage unit and
the second storage unit stores second interpolation value dividing information obtained by dividing the interpolation value information in the second dividing position and has relation information between the second interpolation value dividing information and the third storage unit.

9. The storage medium according to claim 7, wherein the first storage unit stores a first interpolation value dividing information obtained by dividing interpolation value information obtained by interpolating a value in the desired range, other than the border value information, in the first dividing position and has relation information between the first interpolation value dividing information and the third storage unit.

10. The storage medium according to claim 7, wherein the second storage unit stores second interpolation value dividing information obtained by dividing the interpolation value information in the second dividing position and has relation information between the second interpolation value dividing information and the third storage unit.

\* \* \* \* \*